(12) United States Patent
Winstead

(10) Patent No.: US 6,304,055 B1
(45) Date of Patent: Oct. 16, 2001

(54) METHOD AND APPARATUS FOR EFFICIENTLY OPERATING A HYBRID VEHICLE

(75) Inventor: Vincent John Winstead, Madison, WI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/607,809

(22) Filed: Jun. 30, 2000

(51) Int. Cl.⁷ .......................... H01M 10/44; H01M 10/46
(52) U.S. Cl. ............................. 320/104; 320/132
(58) Field of Search .................... 320/104, 132, 320/134, 136, 163, 164, DIG. 21

(56) References Cited

U.S. PATENT DOCUMENTS

| 5,264,764 | * 11/1993 | Kuang . |
| 5,416,712 | 8/1998 | Ibaraki et al. . |
| 5,786,640 | * 7/1998 | Sakai et al. . |
| 5,820,172 | 10/1998 | Brigham et al. . |
| 6,166,517 | * 12/2000 | Wakashiro et al. . |

FOREIGN PATENT DOCUMENTS

WO 95/32100   11/1995   (WO) .

* cited by examiner

*Primary Examiner*—Edward H. Tso
(74) *Attorney, Agent, or Firm*—Ford Global Tech., Inc.

(57) ABSTRACT

A method and an apparatus for operating a hybrid vehicle 10 which requires the creation of a state of charge value and which further requires the modification of the state of charge value in accordance with the monitored speed of the vehicle 10, effective to allow the hybrid vehicle 10 to be efficiently operated.

20 Claims, 1 Drawing Sheet

METHOD AND APPARATUS FOR EFFICIENTLY OPERATING A HYBRID VEHICLE

FIELD OF THE INVENTION

The present invention generally relates to a method and an apparatus for efficiently operating a hybrid vehicle and more particularly, to a method and apparatus for storing and dynamically adjusting a state of charge threshold value which is effective to allow torque to be efficiently transferred to the wheels of a hybrid vehicle.

BACKGROUND OF THE INVENTION

A hybrid vehicle typically utilizes several sources of energy which are selectively and alternatively adapted to generate torque which is transferred to the wheels of the vehicle. At least one of these energy sources typically comprises, by way of example and without limitation, an electrical battery assembly which must be periodically "recharged" in combination with an electric motor. The second source of torque usually comprises an internal combustion engine which is typically adapted to generate and communicate torque to the wheels while selectively recharging the battery assembly when the state of charge of the battery assembly (i.e., the amount of electrical charge contained within the battery assembly) falls below a certain threshold value.

Each source of energy typically transfers the respectively produced torque to the vehicle wheels with a certain efficiency which is dependent upon several operating attributes of the vehicle (i.e., the speed of the vehicle). For instance, the internal combustion engine efficiently transfers torque to the wheels at relatively high speeds. However, the torque transfer efficiency of the internal combustion engine is reduced when it is also selectively charging the battery assembly.

A hybrid vehicle does not include an apparatus or employ a method to select one of several energy sources in a manner which is effective to ensure efficient torque transfer operation and does not include an apparatus or a method to operate the selected energy source (e.g., the internal combustion engine) in a manner which further ensures efficient operation and efficient torque transfer, thereby undesirably and unnecessarily wasting a portion of the generated energy.

There is therefore a need for a method and an apparatus for selecting an energy source and for transferring torque in a hybrid vehicle which overcomes at least some of the previously delineated drawbacks of prior hybrid vehicles and which, by way of example and without limitation, allows the generated torque to be efficiently transferred to the wheels of the vehicle.

SUMMARY OF THE INVENTION

It is a first object of the present invention to provide a method and an apparatus for efficiently operating a hybrid vehicle which overcomes at least some of the previously delineated drawbacks of prior hybrid vehicles.

It is a second object of the present invention to provide a method and apparatus for efficiently transferring torque within a hybrid vehicle.

It is a third object of the present invention to provide a method and an apparatus for selecting one of several energy sources which are operatively disposed within a hybrid vehicle, effective to allow torque to be transferred to the wheels of the vehicle in an efficient manner.

It is a fourth object of the present invention to provide a method and an apparatus for transferring torque within a hybrid vehicle which overcomes at least some of the previously delineated drawbacks of prior hybrid vehicles and which dynamically selects one of several energy sources, depending upon a certain state of charges value, effective to allow the hybrid vehicle to be efficiently operated.

It is a fifth object of the present invention to provide a method and an apparatus for transferring torque within a hybrid vehicle which overcomes at least some of the previously delineated drawbacks of prior hybrid vehicles and which dynamically creates and dynamically modifies a state of charge threshold value effective to allow the hybrid vehicle to be efficiently operated.

According to a first aspect of the present invention an apparatus for use within a hybrid vehicle is provided. The apparatus comprises a controller which stores a state of charge value and which selectively modifies the state of charge value in response to the speed of the vehicle.

According to a second aspect of the present invention a method is provided for use with a hybrid vehicle. The method comprises the steps of creating a state of charge value; monitoring the speed of the hybrid vehicle; and reducing the value in response to an increase in the speed of the vehicle.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
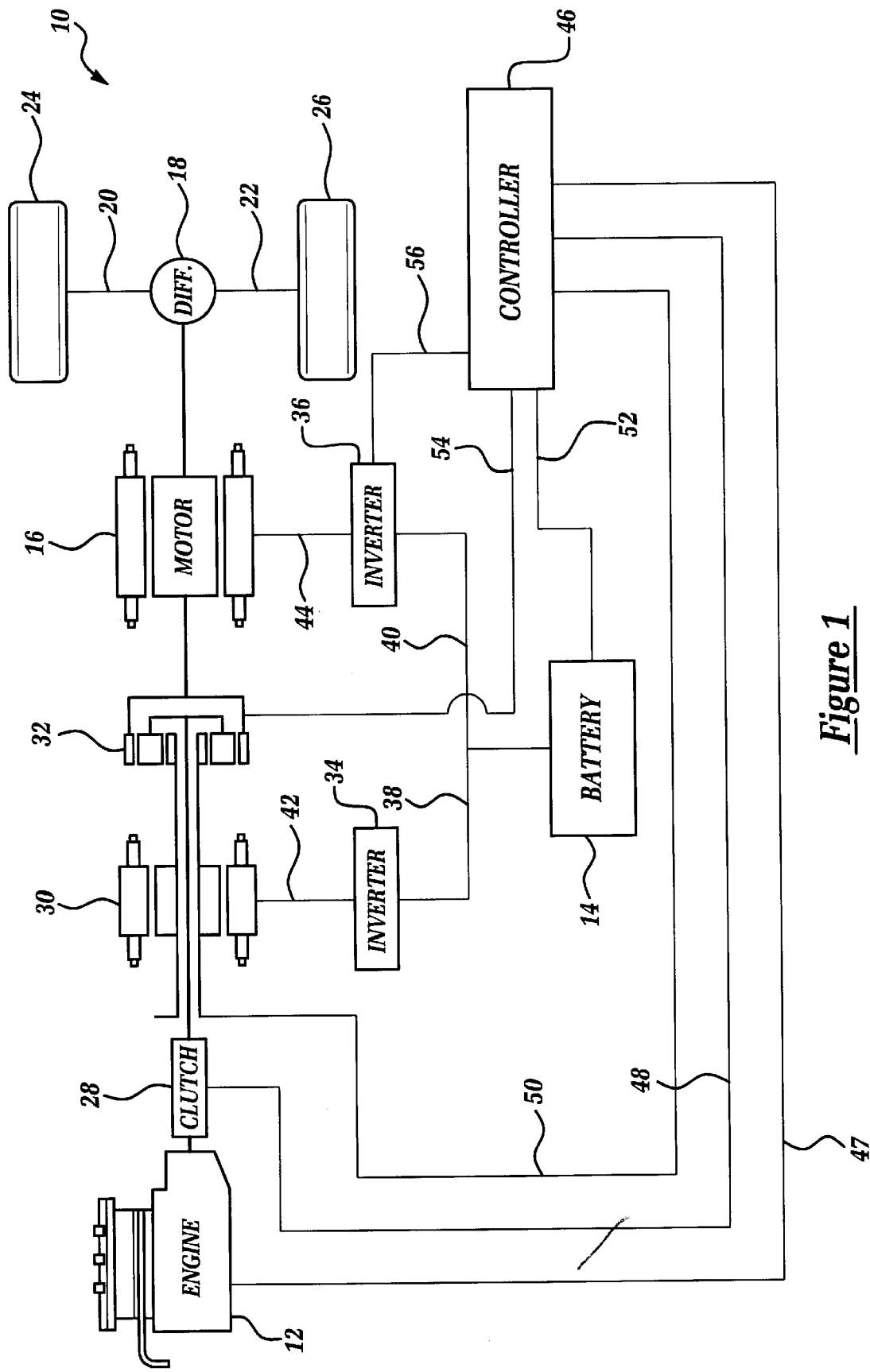
FIG. 1 is a partial side view of a hybrid vehicle which is made in accordance with the teachings of the preferred embodiment of the invention

Referring now to FIG. 1, there is shown a hybrid vehicle 10 which is made in accordance with the teachings of the preferred embodiment of the invention. As shown, vehicle 10 includes a first source of torque energy (i.e., in one non-limiting embodiment an internal combustion engine) 12, an electrical battery 14, and a motor 16. In one non-limiting embodiment of the invention, the battery 14 and the motor 16 cooperatively comprise a second source of torque energy.

Hybrid vehicle 10 further includes a differential assembly 18 which is movably coupled to a pair of axles 20, 22, and a pair of substantially identical wheels 24, 26. As shown, wheel 24 is movably coupled to the axle 20 while wheel 26 is movable coupled to the axle 22. Further, hybrid vehicle 10 includes a clutch 28, a generator 30, and a planetary gear assembly 32.

As shown, the clutch 28 is coupled to the first source of torque energy. 12 (i.e., to the selectively movable output shaft of the internal combustion engine 12), and to the generator 30. The generator 30 is coupled to the planetary gear assembly 32 and the planetary gear assembly 32 is further coupled to the motor 16. The selectively rotable output shaft of the motor 16 is coupled to the differential assembly 18.

Hybrid vehicle 10 further includes a pair of substantially identical electrical power inverters 34, 36 which are respectively, electrically, and physically coupled to the battery 14 by busses 38, 40. Inverters 34, 36 are further respectively, electrically, and physically coupled to the generator 30 and to the motor 16 by use of busses 42, 44.

Further, hybrid vehicle 10 includes a controller 46 which is operable under stored program control and which is electrically, communicatively, and physically coupled to the engine 12, clutch 28, generator 30, battery 14, planetary gear assembly 32, and inverter 36 by respective busses 47, 48, 50, 52, 54, and 56. The controller 46 periodically monitors the state of charge resident within the battery 14 and stores a certain state of charge threshold value. Controller 46, by use of clutch 28, gear assembly 32, and generator 30 allows motor 16 to operatively receive electrical power from the battery 14 and generate and provide torque to the differential 18 and to wheels 24, 26, and alternatively cause the engine 12 to operate and generate torque which is transferred to the differential 18. Moreover, in this manner and when the measured/monitored state of charge falls below the stored threshold value, controller 46 typically causes the internal combustion engine 12 to operate and provide electrical charge to the battery assembly 14 though and/or by use of the inverter 34. Regenerative charge may be supplied by the motor 16 through inverter 36.

In the preferred embodiment of the invention and in order to ensure the efficient transfer of torque within hybrid vehicle 10, controller 46 decreases the stored state of charge threshold value when the vehicle 10 is driven at or exceeds a certain predetermined speed for a predetermined period of time and further ensures that the internal combustion engine 12 is utilized at those speeds (and not motor 16) without providing electrical charge to the battery assembly 14, thereby ensuring efficient torque transfer from the internal combustion engine 12 to the wheels 24, 26. In one non-limiting embodiment of the invention, this is done by storing an initial state of charge threshold value which is denoted as "SOC" and creating an updated state of charge value which is denoted as "SOC updated" in the following manner.

$$SOC_{updated} = SOC_{initial} + (C_1 \ast a_r + C_2 \ast a_p) \ast a_s \ast C_{as} \quad \text{(equation 1)}$$

Where the terms "$C_1$", "$C_2$", and "$C_{as}$" are constant and wherein the constraints on these constants is as follows: $C_1 + C_2 = 2$; and $C_1$, $C_2$, $C_{as} > 0$. In one non-limiting embodiment the values of "$C_1$" and "$C_2$", are equal to 1 and the value of "$C_{as}$" is equal to the value of "$a_s$" which is delineated below.

The term "$a_r$" is a regenerative power term and is calculated as follows:

$$a_r = 1 - V_{avg}/(0.75 \ast S_{RES}); \text{ when } V_{avg} \leq (0.75) \ast S_{RES} \quad \text{(equation 2)}$$

$$a_r = -(V_{avg} - (0.75 \ast S_{RES})/(1.25 \ast S_{HWY} - 0.75 \ast S_{RES})); \text{ when } V_{avg} > (0.75) \ast S_{RES} \quad \text{(equation 3)}$$

here the term "$S_{RES}$" denotes a residential or relatively slow speed (e.g. about 30 miles per hour), where the term "$S_{HWY}$" denotes a relatively fast or typical highway speed (e.g., about 55 miles per hour) and where the term "$V_{avg}$" is a measure of the average speed of the vehicle 10 over some predetermined period of time beginning at time denoted as "t-n" and ending at a time of "t" and which may be represented as follows:

$$V_{avg} = (1/n) \ast \sum_{i=t-n}^{t} (V_C^i) \quad \text{(equation 3)}$$

and where the term "n" denotes the number of acquired speed samples.

The term "$a_p$" is as a power adjustment term and is calculated as follows:

$$a_p = e\_stat_{avg} \quad \text{(equation 4)}$$

$$e\_stat = 1; \; P_{engine} > P_{threshold} \quad \text{(equation 5)}$$

$$e\_stat = -1; \; P_{engine} \leq P_{threshold} \quad \text{(equation 6)}$$

$$e\_stat_{avg} = (1/n) \ast \sum_{i=t-n}^{t} (e\_stat_i) \quad \text{(equation 7)}$$

Where the the term "$P_{engine}$" denotes the power produced by the vehicle engine 12 and the term "$P_{threshold}$" has a selectable value which may be dependant upon the state of charge of the battery 14.

The term "$a_s$" is a scaling adjustment term and is calculated as follows:

$$a_s = \exp(-0.01 \ast a^2) \quad \text{(equation 8)}$$

where the term "a" is calculated as follows.

$$a^2 = \left(\sum_i (V_C^i)^2 - \left[\sum_i (V_C^i)\right]^2\right) / [(n-1)^2]; \quad \text{(equation 9)}$$

$$i = 1, 2, \ldots, n$$

In this manner, the initial state of charge threshold value is decreased when the speed of the vehicle 10 exceeds the value of "$S_{RES}$" for a predetermined period of time. In this manner, controller 46 only allows the internal combustion engine 12 to provide torque to the differential 18 without providing electrical charge to the battery 14 at this relatively high speed until the state of charge of the battery 14 falls below this newly reduced state of charge threshold limit. Since the threshold value has been reduced, the engine will probably operate for a relatively long period of time, at this relatively high speed, before it is necessary to supply charge to the battery 14.

As the speed of the vehicle 10 is reduced, the currently stored state of charge threshold value is increased (e.g., made to equal its previous or initial value) in order to ensure that the battery 14 receives the desired charge at this relatively slow speed. Further, as should be apparent from the foregoing discussion, the currently stored state of charge threshold value may be selectively and periodically modified in the foregoing manner as the vehicle is driven at a variety of speeds. It should be further understood that in other non-limiting embodiments, the foregoing methodology may be replaced by other threshold decreasing algorithms (i.e., decreasing the threshold value immediately or shortly after the speed of the vehicle increases to a certain level).

It should be appreciated that the invention is not limited to the exact method which has been previously delineated above, but that various changes and modifications may be made without departing from the spirit of the scope of the inventions as are more fully set forth in the following claims.

What is claimed is:

1. An apparatus for use within a hybrid vehicle, said apparatus comprising a controller which stores a state of charge threshold value, which measures at least one attribute of said hybrid vehicle, and which selectively modifies said state of charge threshold value in accordance with said measured at least one attribute.

2. The apparatus of claim 1 wherein said measured at least one attribute comprises the speed of said hybrid vehicle.

3. The apparatus of claim 2 wherein said state of charge threshold value is reduced when said speed exceeds a certain speed value.

4. The apparatus of claim 2 wherein said state of charge threshold value is reduced when said speed exceeds a certain speed value for a predetermined period of time.

5. The apparatus of claim 4 wherein said certain speed comprises a relatively high speed.

6. An apparatus for use with a hybrid vehicle of the type having a plurality of wheels, an internal combustion engine, and a second energy source, wherein said internal combustion engine and said second energy source respectively and selectively provide torque to a pair of wheels of said hybrid vehicles, said apparatus comprising:

a controller which is coupled to said internal combustion engine and to said second energy source and which substantially prevents said second energy source from providing said torque when said hybrid vehicle exceeds a certain speed.

7. The apparatus of claim 6 wherein said certain speed comprises a relatively high speed.

8. The apparatus of claim 6 wherein said second energy source comprises an electric battery.

9. The apparatus of claim 8 wherein said controller allows said internal combustion engine to provide electrical charge to said electric battery when said hybrid vehicle is traveling at a speed which is less than said certain speed.

10. The apparatus of claim 8 wherein said controller allows only said internal combustion engine to provide said torque to said wheels when said hybrid vehicle exceeds said certain speed.

11. The apparatus of claim 10 wherein said controller stores a state of charge value and wherein said controller monitors the state of charge of said electric battery and compares said monitored state of charge with said state of charge value and, based upon said comparison, causes said internal combustion engine to provide electrical charge to said electric battery.

12. The apparatus of claim 11 wherein said controller measures at least one attribute of said vehicle and, in response to said at least one measured attribute, changes said state of charge value.

13. The apparatus of claim 12 wherein said at least one attribute comprises speed.

14. The apparatus of claim 13 wherein said controller decreases said state of charge value when said speed increases.

15. The apparatus of claim 13 wherein said controller decreases said state of charge value when said speed increases over a pre-determined period of time.

16. A method for operating a hybrid vehicle having a battery, said method comprising the steps of creating a state of charge threshold value; monitoring an attribute of the vehicle; and changing said value in accordance with the monitored attribute.

17. The method of claim 16 wherein said attribute comprises speed.

18. The method of claim 17 wherein said value is decreased when said speed increases.

19. The method of claim 17 wherein said value is decreased when said speed increases over a certain time.

20. The method of claim 17 further comprising the step of monitoring the state of charge of said battery; and providing electric charge to said battery when said monitored state of charge is less than said value.

* * * * *